United States Patent [19]

Laufer

[11] Patent Number: 4,711,221
[45] Date of Patent: Dec. 8, 1987

[54] FUEL INJECTION PUMP

[75] Inventor: Helmut Laufer, Gerlingen, Fed. Rep. of Germany

[73] Assignee: Robert Bosch GmbH, Stuttgart, Fed. Rep. of Germany

[21] Appl. No.: 857,660

[22] Filed: Apr. 30, 1986

[30] Foreign Application Priority Data

May 8, 1985 [DE] Fed. Rep. of Germany ....... 3516455

[51] Int. Cl.⁴ .......................................... F02M 39/00
[52] U.S. Cl. .................... 123/503; 123/449; 123/496; 123/467; 417/492
[58] Field of Search ............... 123/503, 449, 467, 496; 417/500, 492

[56] References Cited

U.S. PATENT DOCUMENTS

| | | | |
|---|---|---|---|
| 4,384,047 | 8/1981 | Stumpp | 123/449 |
| 4,409,939 | 10/1983 | Eheim | 123/449 |
| 4,476,835 | 10/1984 | Laufer | 123/503 |

FOREIGN PATENT DOCUMENTS

| | | | |
|---|---|---|---|
| 2353737 | 5/1975 | Fed. Rep. of Germany | 123/449 |
| 3326973 | 2/1985 | Fed. Rep. of Germany | 123/449 |
| 3135877 | 3/1985 | Fed. Rep. of Germany | 123/449 |
| 3336869 | 4/1985 | Fed. Rep. of Germany | 123/449 |
| 0132022 | 10/1979 | Japan | 123/449 |

Primary Examiner—Carl Stuart Miller
Attorney, Agent, or Firm—Edwin E. Greigg

[57] ABSTRACT

A fuel injection pump for internal combustion engines having a pump piston defining a pump work chamber and having control of the injection quantity by the opening, during the compression stroke of the pump piston, an axially displaceable regulating slide disposed about the pump piston, and of a relief conduit extending in the pump piston and discharging into the jacket face of the pump piston. Upon the opening, the relief conduit discharges into an outflow conduit provided between the pump piston and the regulating slide; at the onset of the opening stroke this conduit is fully opened, and during the course of the stroke it is throttled.

9 Claims, 4 Drawing Figures

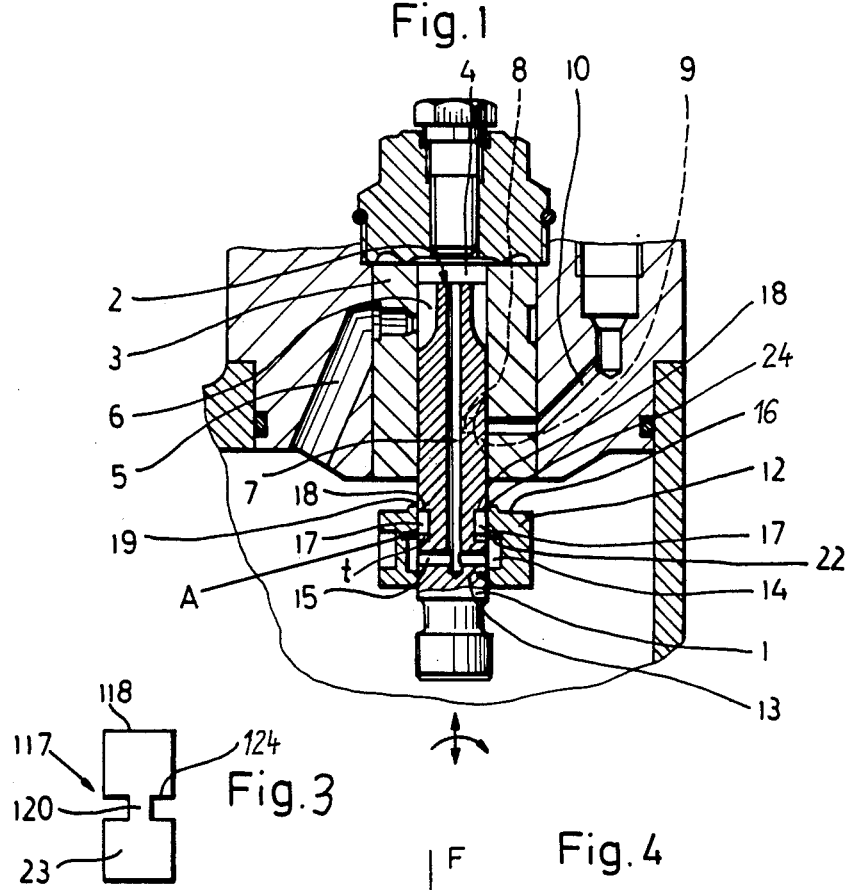
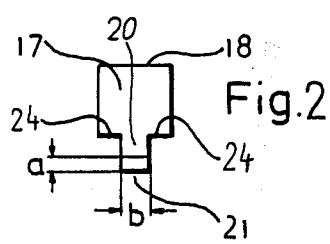
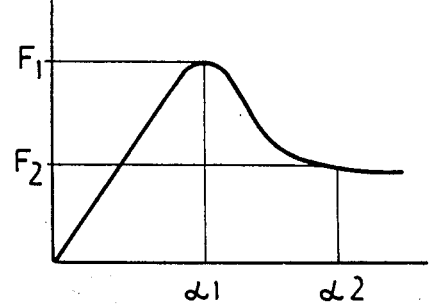

FUEL INJECTION PUMP

BACKGROUND OF THE INVENTION

The invention is directed to improvements in fuel injection pumps having a reciprocating pump piston.

In known fuel injection pumps of this type, the relief conduit of the pump work chamber is opened up by the regulating slide, in order to terminate the injection, and it remains open until the end of the compression stroke. Depending upon the axial position of the regulating slide, this opening of the relief conduit occurs after a variable compression stroke has been executed, or after the injection of an injection quantity corresponding to such a compression stroke. Particularly in fuel injection pumps operating at a high injection pressure, as is the case for direct injection engines, for instance, the high relieving speed of the fuel, which flows out counter to a very low fuel pressure, causes hollow spaces to appear in the pump work chamber and in the conduits communicating with it, possibly extending even as far as the pressure lines, depending upon the type of pressure valve involved. Because of the time available until the next compression stroke and the relatively low supply pressure while the pump work chamber is being refilled, these hollow spaces are often only inadequately refilled. This causes cavitation in the pump work chamber, on the one hand, and on the other hand results in a reduced actual injectible fuel quantity as compared with the set-point quantity set by the regulating slide. There is also a shift in the onset of fuel supply or fuel injection, because the hollow spaces must first be refilled with fuel, before the required injection pressure can be built up.

Because of this negative pressure in the pump work chamber, it is also possible for such a high pressure difference to develop at the opening valve of the fuel injection nozzle that gases can travel from the engine combustion chamber through the nozzle into the injection lines, before the nozzle needle has closed; this can cause soiling of the valve seat and attendant leakage, and it also amplifies the decrease in the setpoint injection quantity and the fluctuations in the injection onset mentioned above.

OBJECT AND SUMMARY OF THE INVENTION

It is an object of the invention to provide a fuel injection pump having the advantage over the prior art that by effecting rapid closure of the injection nozzle, a sharply defined end of the injection cycle is attained. Because the opening conduit is fully opened at the onset, and because of the ensuing throttling by the opening conduit, the outflow speed of the relieved fuel is decreased; the primary result of this action is to preclude the formation of hollow spaces in the pump work chamber or in the conduits communicating with it. Furthermore, the specified function of the injection nozzle is not disrupted by unintended pressure fluctuations in the fuel injection line, so that combustion gases cannot get into the injection lines.

It is another object of the invention to provide that the jacket face recess that partly forms the outflow conduit is embodied as an annular groove that coincides with the mouth of the relief conduit during the opening stroke. In contrast to other forms of recesses, this kind of annular groove can be located and fabricated very accurately in the inner bore of the regulating slide. The smooth limiting edges of this annular groove are used for control, so that the morecomplicated shapes can be provided on the control edges of the recesses of the pump piston jacket face, which are much easier to machine.

It is still another object of the invention to provide a pocket:like recess that partly forms the outflow conduit on the jacket face of the pump piston, downstream of the mouth of the relief conduit. The end of this pocket-like recess remote from the mouth cooperates with the control slide edge formed by the control slide end in order to determine the onset of fuel injection opening, and its other end can be moved to coincide with the annular groove. The other end of the pocket-like recess has a width restriction, the beginning of which is separated from the annular groove after the onset of the opening stroke, so that the width restriction serves to throttle the outflow conduit. A pocket-like recess of this type, having a variable width, can be located very accurately on the jacket face of the pump piston, because it is relatively simple to machine the outside of the pump piston. The beginning and end of the pocket and the restriction itself correspondingly have leading and trailing control edges that are mostly linear and which are very accurately associated with the control edges of the annular groove or annular slide. Depending upon the length, depth and location of the restriction within the pocket-like recess, the throttle cross section can be restricted still further as the pump piston stroke progresses, or it may remain constant.

The invention will be better understood and further objects and advantages thereof will hecome more apparent from the ensuing detailed description of a preferred embodiment taken in conjunction with the drawings.

BRIEF DESCRIPTION OF THE DRAWINGS

FIG. 1 is a longitudinal section taken through the portions of a fuel injection pump relating to the invention;

FIG. 2 is a plan view of a recess disposed in the jacket face of the pump piston;

FIG. 3 is a view corresponding to FIG. 2 but showing a differently shaped recess; and FIG. 4 is a function diagram of the diversion cross section over the piston stroke.

DESCRIPTION OF THE PREFERRED EMBODIMENTS

A pump piston 1 is set into simultaneously reciprocating and rotating motion as indicated by the arrows by means not shown. with its end face 2 remote from the drive means, it defines one side of a pump work chamber 4 provided in the housing 3. An intake conduit 5 that is controllable via longitudinal grooves provided in the pump piston discharges into the pump work chamber 4. The pump piston has a central axial bore 7, with a radial bore 8 branching off from it and discharging into a longitudinal groove 9. By means of this longitudinal groove 9, acting as a distributor groove, pressure lines 10 are successively made to communicate with the pump work chamber 4. These pressure lines 10 are distributed at regular intervals about the piston 1 and correspond in number to the number of stroke movements of the pump piston 1 during a single rotation and also to the number of engine cylinders to be supplied.

A regulating slide 12 is disposed on the pump piston 1 and is axially displaceable by means of an rpm governor, not shown, which may function by mechanical or electrical means. In the jacket face 13 of the inner bore of the regulating slide 12, an annular groove 14 is provided, into which a transverse bore 15 extending in the pump piston 1 discharges after a predetermined compression stroke has been executed; the transverse bore 15 communicates with the central bore 7 and in common with it forms a relief conduit. On sides remote from one another in the jacket face of the pump piston 1, pockets 17 are provided which coincide with the annular groove 14. The pockets include the leading control edge 18 remote from the annular groove 14 cooperating with a control edge 19 of the regulating slide 12, this control edge 19 being formed by the intersection of the end face 16 of the control slide with its central bore 13.

In FIG. 2, the pocket 17 is shown in plan view. While one side of the pocket 17 is defined by the straight leading control edge 18, on the side oriented toward the annular groove 14 the pocket 17 has a restricted portion 20, which results in an interrupted control edge 24, the restricted portion 20 of which has a width less than that of the pocket 17, which width portion is defined by a trailing control edge 21 extending parallel to the leading control edge 18.

The fuel injection pump described functions as follows:

During the outward intake stroke of the pump piston 1, fuel is carried into the pump work chamber 4 via the intake line 5 and one of the longitudinal grooves 6. Then as soon as the compression stroke begins, this fuel is pumped out of the pump work chamber 4 to the injection nozzle via the central bore 7 and the branching bore 8, the distributor groove 9 and one of the pressure lines 10. Whenever an outflow conduit is opened up by the interaction of leading control edge 18 with the control edge 19 of regulating slide 12, after a predetermined supply stroke that is a function of the axial position of the regulating slide 12 has been executed, then fuel flows out of the pump work chamber 4, with a simultaneous pressure drop, via the central bore 7, the transverse bore 15, the annular groove 14 and the pocket 17.

As the pump piston 1 continues its supply stroke, the interrupted control edge 24 of the pocket 17 overtakes the limiting edge 22 of the annular groove 14, causing throttling of this outflow conduit, which comprises the annular groove 14 and restricted portion 20 of the pocket 17. If the length a remaining at the relevant pump stroke of the restricted portion 20 within the annular groove 14 is less than the depth t of the restricted portion 20 of the pocket 17, then the throttle cross section is determined by the width b of this restricted portion 20 of the pocket 17 and said remaining length a. Contrarily, if the depth t of the restricted portion 20 of the pocket 17 is less than the remaining lenght a, then the flow cross section is determined by a throttle cross section comprising the width b of this restricted portion 20 and its depth t. In this manner, the throttling effect can be made dependent on the length of opening stroke by suitable forming of the cross sections of the restricted portion 20 of the pocket 17.

In FIG. 3, a pocket 117 of different configuration is shown. Naturally, the leading control edge 118 is again provided here, which along with the control edge 19 of the regulating slide 12 initiates the relief. The pocket 117 comprises two wide portions, however, which communicate with one another via a restricted portion 120. While the portion 23 oriented toward the annular groove 14 always remains in coincidence with the annular groove 14, the restricted portion 120 is arranged to gradually become overlapped by the jacket face of the bore 13 of the regulating slide 12, once the control edges 124 have moved away from the annular groove 14, and thus this restricted portion 120 determines the throttle cross section of the outflow conduit.

In the diagram shown in FIG. 4, the rotational angle alpha ($\alpha$) of the pump piston is plotted on the abscissa, and the cross section f of the outflow conduit is plotted on the ordinate. As indicated by the curve shown, the opening cross section of the outflow conduit very rapidly inreases to the value $F_1$ up to the rotational angle $\alpha_1$, and then drops back to the more limited cross section $F_2$, to act as a throttle upon further rotation to angle $\alpha_2$. At the onset of the opening of the outflow conduit, a large outflow cross section is rapidly achieved, which is then subsequently reduced to a value at which the fuel undergoes a certain damming effect, which prevents the pump work chamber 4 and the conduits communicating with it from becoming empty.

The foregoing relates to a preferred exemplary embodiment of the invention, it being understood that other variants and embodiments thereof are possible within the spirit and scope of the invention, the latter being defined by the appended claims.

What is claimed and desired to be secured by Letters Patent of the United States is:

1. A fuel injection pump for internal combustion engines having a reciprocating pump piston defining one end of a pump work chamber and arranged to control an injection quantity by opening a pump work chamber relief conduit, provided in the pump piston for discharge into a jacket face thereof, saqid discharge occuring during a compression stroke of the pump piston via a regulating slide disposed on the pump piston, said slide being axially displaceable thereon to vary the injection quantity, the pump work chamber relief conduit being arranged to discharge into outflow means, said outflow means comprising a relief conduit outlet adjoining said relief conduit, a first recess provided on the pump piston and a second recess provided on the regulating slide, said relief conduit outlet comprising a bore disposed in said pump piston and arranged to exit said jacket face adjacent to said first recess, said recesses being adapted for communication and for selective coincidence therebetween during an opening stroke of said pump piston, said pump piston being arranged to assume a first position wherein the outflow conduit means is fully opened and a second position wherein the outflow conduit means is throttled.

2. A fuel injection pump as claimed in claim 1, in which said first position occurs shortly after onset of said opening stroke of the pump piston and said second position occurs at a later moment in said opening stroke.

3. A fuel injection pump as defined by claim 1, in which said second recess comprises an annular groove which coincides with the relief conduit outlet during said opening stroke of the pump piston.

4. A fuel injection pump as defined by claim 3, in which said first recess comprises a pocket provided in the jacket face of the pump piston downstream of the relief conduit outlet, one end of this first recess remote from said outlet forming a leading control edge arranged to cooperate with a control edge provided upon an end of the regulating slide, an opposite end of the first recess being movable so as to remain in coincidence with said second recess.

5. A fuel injection pump as defined by claim 4, in which said opposite end of said first recess includes a portion having a restricted width, an initial extent of which becomes separated from said second recess after onset of the opening stroke, whereby the restricted portion acts as a throttle in the outflow means.

6. A fuel injection pump as defined by claim 5, in which when a length of the restricted portion of said first recess is less than its depth the throttle cross section formed thereby comprises said length times said restricted width of that extent of the first recess which coincides with the second recess.

7. A fuel injection pump as defined by claim 5, in which when a length of the restricted portion is greater than said depth, the depth and the width of the restricted portion determines the throttle cross section.

8. A fuel injection pump as defined by claim 4, in which said first recess comprises two wide portions joined via a restricted portion, the upstream one of which wide portions is always coincident with the second recess.

9. A fuel injection pump as defined by claim 1, in which the pump piston simultaneously serves as the distributor of a distributor pump.

* * * * *